(12) United States Patent
Kuroki et al.

(10) Patent No.: US 11,577,593 B2
(45) Date of Patent: Feb. 14, 2023

(54) GLASS RUN

(71) Applicant: TOYODA GOSEI CO., LTD., Kiyosu (JP)

(72) Inventors: Mikiya Kuroki, Kiyosu (JP); Hiroaki Nishikawa, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 7 days.

(21) Appl. No.: 17/407,348

(22) Filed: Aug. 20, 2021

(65) Prior Publication Data

US 2022/0097507 A1  Mar. 31, 2022

(30) Foreign Application Priority Data

Sep. 25, 2020  (JP) .............................. JP2020-160819

(51) Int. Cl.
*B60J 10/20* (2016.01)
*B60J 1/17* (2006.01)

(52) U.S. Cl.
CPC ................. *B60J 10/20* (2016.02); *B60J 1/17* (2013.01)

(58) Field of Classification Search
CPC ..... B60J 10/16; B60J 10/21; B60J 5/04; B60J 1/17; B60J 10/20
USPC ........... 296/93, 146, 201; 49/479.1, 21, 213, 49/440, 441, 502
See application file for complete search history.

(56) References Cited

U.S. PATENT DOCUMENTS

| | | | | |
|---|---|---|---|---|
| 4,969,295 A | * | 11/1990 | Nishikawa | B60J 10/78 49/374 |
| 6,237,287 B1 | * | 5/2001 | Nakagawa | B60J 10/21 49/479.1 |
| 9,067,353 B2 | * | 6/2015 | Coldre | B60J 10/45 |
| 9,845,001 B1 | * | 12/2017 | Kojima | B60J 5/0402 |
| 9,849,757 B2 | * | 12/2017 | Stachewicz | B60J 1/10 |
| 10,744,861 B2 | * | 8/2020 | Kawai | B60J 10/21 |
| 2010/0293863 A1 | * | 11/2010 | Okada | B60J 5/0402 49/490.1 |

FOREIGN PATENT DOCUMENTS

JP  2008-006841 A  1/2008

* cited by examiner

*Primary Examiner* — D Glenn Dayoan
*Assistant Examiner* — Sunsurraye Westbrook
(74) *Attorney, Agent, or Firm* — Posz Law Group, PLC (57) ABSTRACT

A glass run having a general portion formed by extrusion molding and a mold-forming portion that connects terminals of the general portion attached to a corner portion of a door frame has a substantially U-shaped cross section including a vehicle exterior side wall, a vehicle interior side wall, and a bottom wall joining the vehicle exterior side wall and the vehicle interior side wall; and has a vehicle exterior side seal lip and a vehicle interior side seal lip that obliquely protrude in an inner direction of an opening having the substantially U-shaped cross section from the vehicle exterior side wall and the vehicle interior side wall, respectively, and the vehicle exterior side seal lip of the mold-forming portion is formed with a seal lip extension portion having a seal lip length extended as compared to the vehicle exterior side seal lip formed in the general portion.

4 Claims, 8 Drawing Sheets

GLASS RUN

CROSS REFERENCE TO RELATED APPLICATION

This application claims the priority benefit of Japanese Patent Application No. 2020-160819 filed on Sep. 25, 2020. The entirely of the above-mentioned patent application is hereby incorporated by reference herein and made a part of this application.

BACKGROUND OF THE INVENTION

(1) Field of the Invention

The present invention relates to a mold-forming portion of a glass run that is attached to an inner periphery of a door frame of a door of an automobile and includes a general portion formed by extrusion molding and a mold-forming portion that connects terminals of the general portion attached to a corner portion of the door frame.

(2) Description of Related Art

Figure 1:
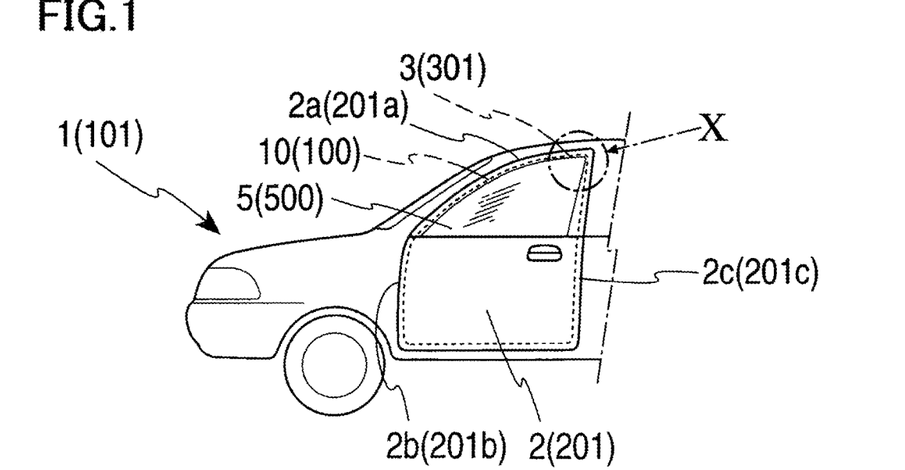
FIG. 1 is a side view of a front side of an automobile.
Figure 8:
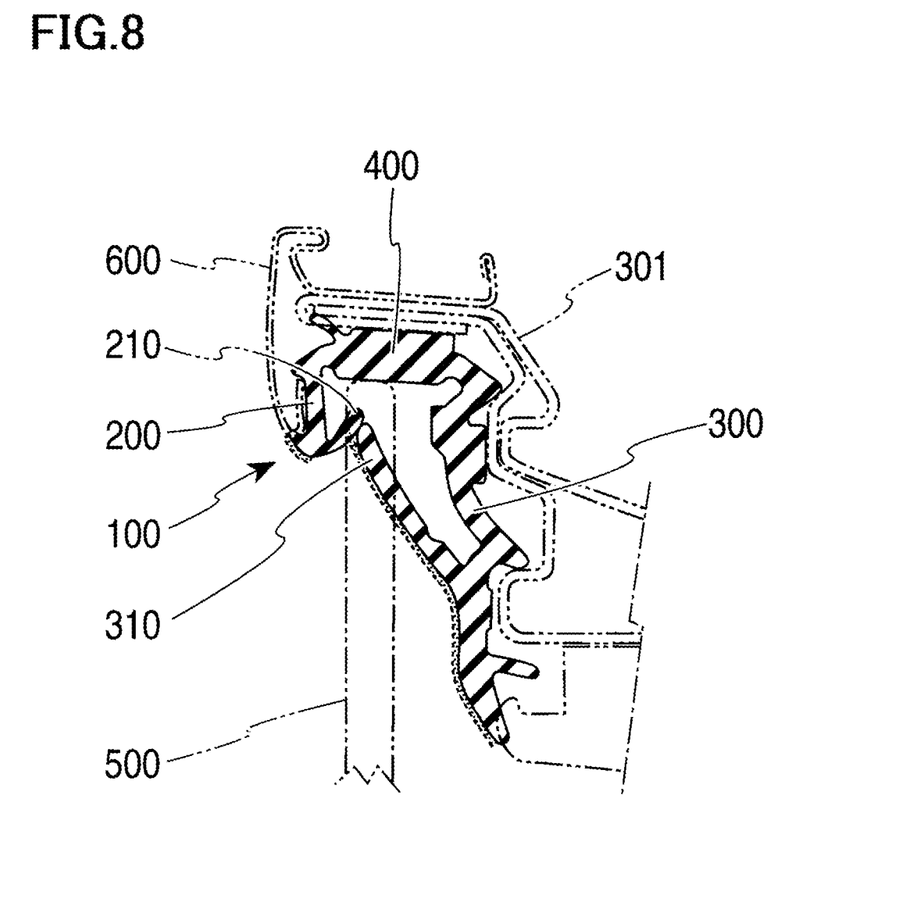
FIG. 8 is a cross-sectional view of a conventional glass run at substantially the same position as that in FIG. 6 in a region X in FIG. 1.

As illustrated in FIGS. 1 and 8, a glass run 100 attached to a door frame 301 and a door molding 600 of an automobile 101 has a vehicle exterior side seal lip 210 and a vehicle interior side seal lip 310 which are curved obliquely and arcuately to protrude from a vehicle exterior side wall 200 and a vehicle interior side wall 300 toward an inside of an opening edge of a substantially U-shaped space in cross section including the vehicle exterior side wall 200, the vehicle interior side wall 300, a bottom wall 400 joining the vehicle exterior side wall 200 and the vehicle interior side wall 300. FIG. 8 is a cross-sectional view of a mold-forming portion (region X in FIG. 1) at substantially the same position as FIG. 6 (line D-D in FIG. 2) to be described later.

When a door glass 500 is closed, the door glass 500 is received in the U-shaped space, and both the vehicle exterior side seal lip 210 and the vehicle interior side seal lip 310 are bent to elastically contact the door glass 500, thereby ensuring sealability with the door glass 500. In addition, the glass run 100 is formed larger on the vehicle interior side than on the vehicle exterior side, and is formed asymmetrically with respect to the door glass 500.

The glass run 100 is disposed at a portion corresponding to a front vertical side portion 201b and a rear vertical side portion 201c in the vehicle front-rear direction of the door 201 illustrated in FIG. 1 and an upper side portion 201a along the roof shape of the door 201. After the general portion manufactured by extrusion molding is cut into a predetermined size, a connection between the upper side portion 201a and the front vertical side portion 201b and a connection between the upper side portion 201a and the rear vertical side portion 201c are joined by mold forming. Note that, in the mold-forming portion, the shapes of the vehicle interior side wall 300 and the vehicle interior side seal lip 310 are changed depending on the location, but the shapes of the bottom wall 400, the vehicle exterior side wall 200, and the vehicle exterior side seal lip 210 are basically the same.

Meanwhile, in the general portion manufactured by extrusion molding, a sliding portion made of a sliding material is formed on the door glass 500 side of the vehicle exterior side seal lip 210 and the vehicle interior side seal lip 310, and the sliding property is improved when the door glass 500 is opened and closed. However, it is difficult to form the sliding portion made of the sliding material in the mold-forming portion. Therefore, sliding with respect to the door glass 500 is worse in the mold-forming portion than in the general portion.

As a result, when the door glass 500 is opened, the vehicle exterior side seal lip 210 is reversed in the mold-forming portion, and generation of abnormal noise due to the reversal has become a problem. The reversal of the vehicle exterior side seal lip 210 is caused by the following.

Figure 9:
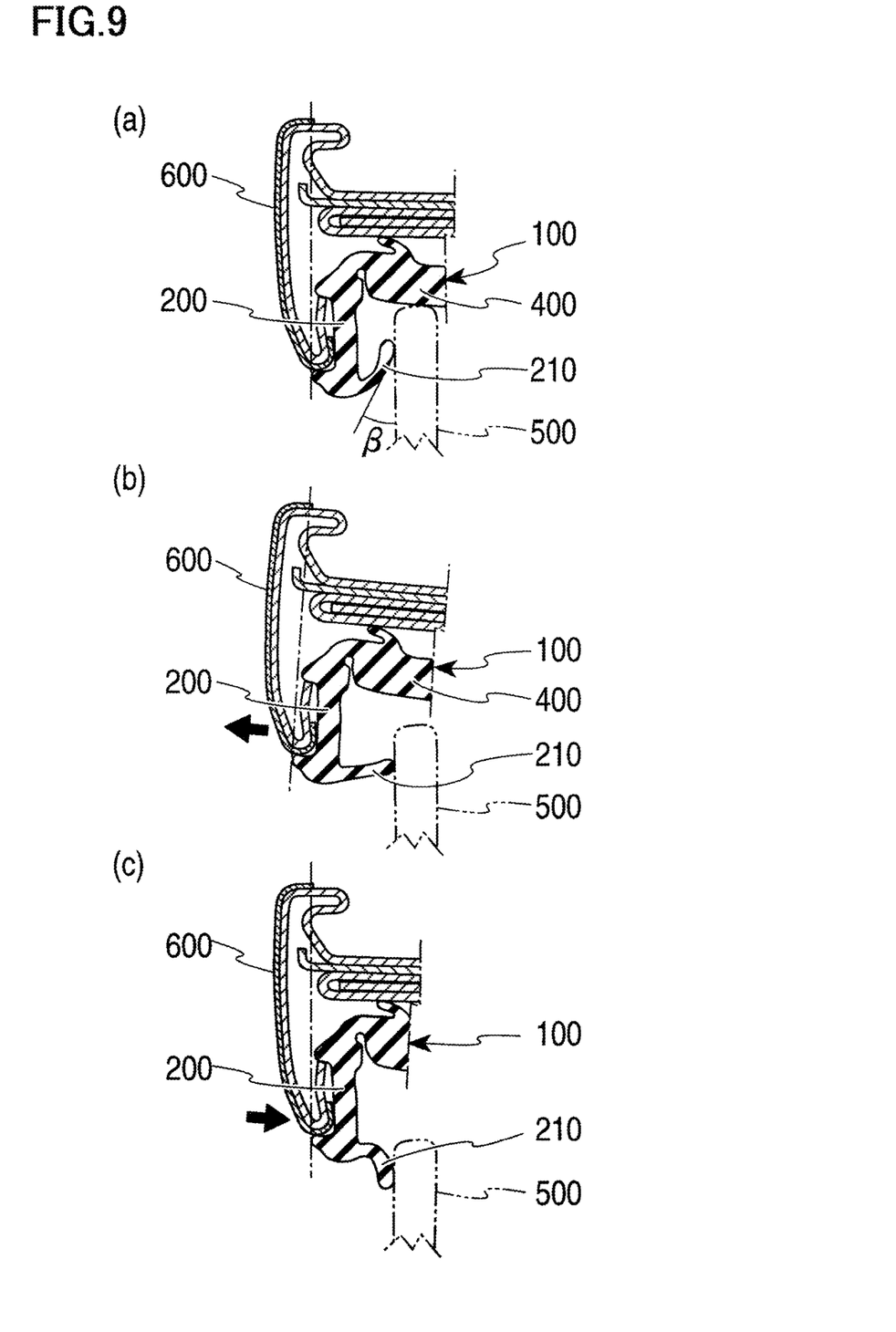

FIGS. 9A, 9B, and 9C are diagrams for explaining a positional relationship among the door glass 500, the vehicle exterior side wall 200 of the glass run 100, the vehicle exterior side seal lip 210, and the door molding 600 in the mold-forming portion. An alternate long and short dash line indicates an inclination of the door molding 600.

In the mold-forming portion, when the door glass 500 is opened from the state in which the door glass 500 is closed (FIG. 9A), that is, when the door glass 500 moves downward, as described above, sliding with respect to the door glass 500 is worse in the mold-forming portion than in the general portion. Therefore, the vehicle exterior side seal lip 210 is pulled by the door glass 500, a force of lowering the door glass 500 is transmitted to a distal end portion of the vehicle exterior side seal lip 210, and the vehicle exterior side seal lip 210 pushes the door molding 600 toward the vehicle exterior side. At that time, when the door frame on the vehicle exterior side has a low rigidity (for example, in the case of the door molding 600 of a door frame 301 of a hidden type), the lower portion of the door molding 600 on the vehicle exterior side is deformed to the vehicle exterior side.

As the door glass 500 moves downward, the degree of deformation of the door molding 600 increases, the distance between the door molding 600 and the door glass 500 increases, and as illustrated in FIG. 9B, the vehicle exterior side seal lip 210 becomes substantially horizontal. Then, when the door glass 500 further moves downward from that state, as illustrated in FIG. 9C, the vehicle exterior side seal lip 210 rotates downward, that is, reversed.

Figure 10:
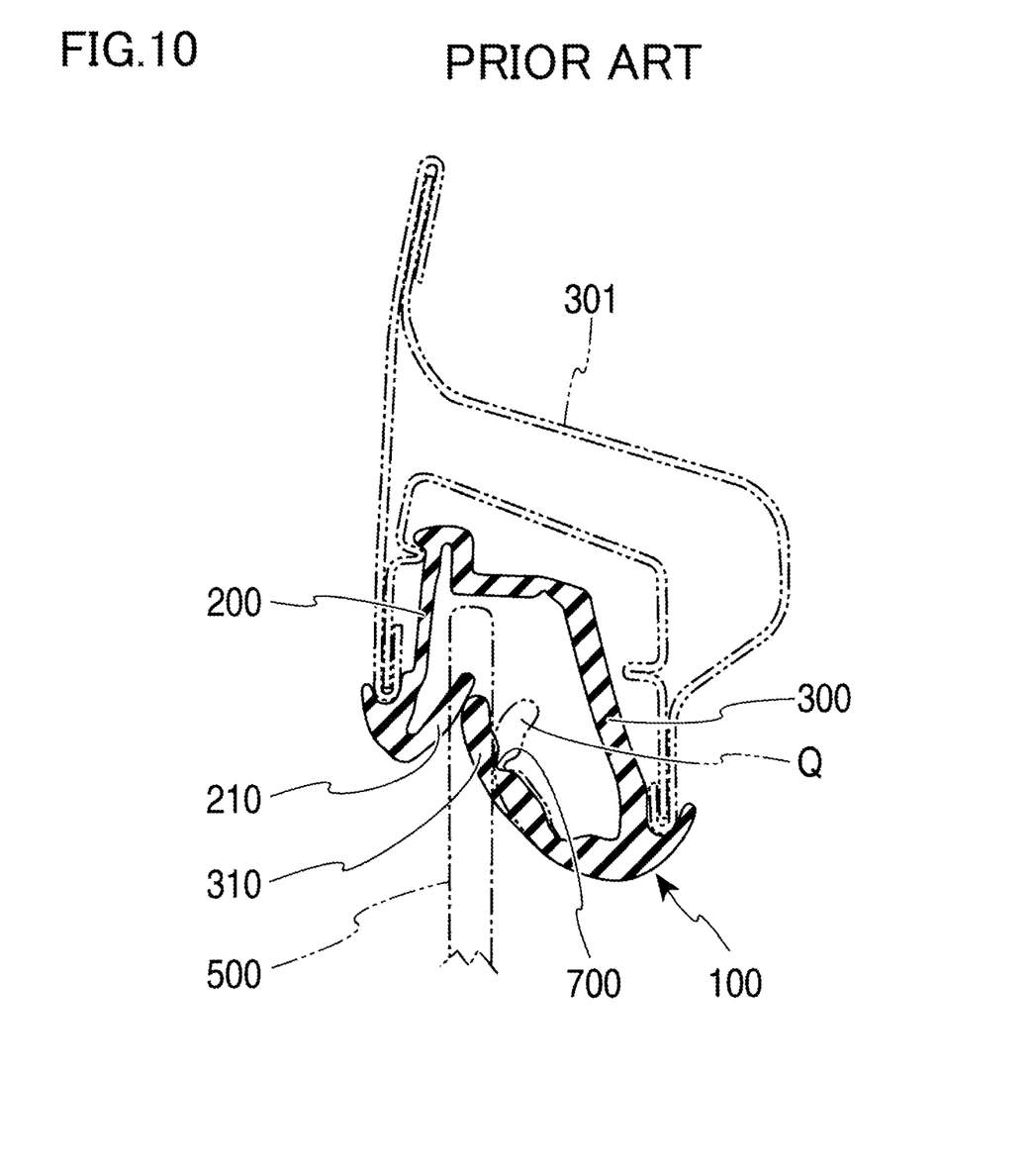
FIG. 10 is a cross-sectional view of a conventional glass run (JP 2008-6841 A).

As a countermeasure for preventing the seal lip from being reversed, JP 2008-6841 A discloses the following technique. As shown in FIG. 10, in JP 2008-6841 A, a notch 700 having a substantially semicircular cross section is formed as an easily deformable portion at a position corresponding to a rear surface of the vehicle interior side seal lip 310 and an intermediate portion of a lip protrusion length (lip length), and a distal end of the vehicle interior side seal lip 310 is easily bent and deformed inward with the notch 700 as a bending point toward an outer surface side of the vehicle interior side wall 300 of the mold-forming portion. In FIG. 10, Q represents that the vehicle interior side seal lip 310 rotates around the notch 700 when the door is closed.

By forming the notch 700, when the door glass 500 is closed, a lip end of the vehicle interior side seal lip 310 is bent and deformed inward with the notch 700 on the rear surface as a bending point toward the outer surface side of the vehicle interior side wall 300 of the mold-forming portion, so that the lip end does not come into pressure contact with or elastic contact with the door glass 500. As a result, even when the door glass 500 is opened, the lip end of the vehicle interior side seal lip 310 does not follow the movement of the door glass 500, and the reversal phenomenon of the vehicle interior side seal lip 310 can be prevented in advance. Note that the above description relates to the vehicle interior side seal lip 310, but JP 2008-6841 A describes that it can be similarly applied to the vehicle exterior side seal lip 210 as necessary.

SUMMARY OF THE INVENTION

However, as is clear from FIG. 10, the seal lip length of the vehicle exterior side seal lip 210 is very short as compared to the seal lip length of the vehicle interior side seal lip 310, and a distance between the vehicle exterior side of the door glass 500 and the vehicle interior side of the vehicle exterior side wall 200 is also narrow. Therefore, the space where an effect involving the notch 700 is exerted is narrow, and the effect of the notch 700 in the vehicle exterior side seal lip 210 is extremely small. Therefore, in JP 2008-6841 A, it is difficult to prevent the reversal phenomenon of the vehicle exterior side seal lip 210.

In order to solve the above problems, claim 1 of the present invention provides a glass run attached to an inner periphery of a door frame of a door of an automobile, guiding raising and lowering of a door glass, and including a general portion formed by extrusion molding and a mold-forming portion that connects terminals of the general portion attached to a corner portion of the door frame, in which the glass run has a substantially U-shaped cross section including a vehicle exterior side wall, a vehicle interior side wall, and a bottom wall joining the vehicle exterior side wall and the vehicle interior side wall; and has a vehicle exterior side seal lip and a vehicle interior side seal lip that obliquely protrude in an inner direction of an opening having the substantially U-shaped cross section from the vehicle exterior side wall and the vehicle interior side wall, respectively, and the vehicle exterior side seal lip of the mold-forming portion is formed with a seal lip extension portion having a seal lip length extended as compared to the vehicle exterior side seal lip formed in the general portion.

According to claim 1 of the present invention, since the vehicle exterior side seal lip of the mold-forming portion of the glass run is formed with the seal lip extension portion having the seal lip length extended as compared to the vehicle exterior side seal lip formed in the general portion, a contact angle between the vehicle exterior side seal lip and the door glass when the door glass is closed with the vehicle exterior side seal lip being elastically in contact with the door glass is smaller than that when the seal lip extension portion is not formed.

Therefore, the vehicle exterior side seal lip is still pulled by the door glass when the door glass is opened, but the force in the direction in which the vehicle exterior side seal lip pushes the door frame toward the vehicle exterior side at that time is smaller than that when the seal lip extension portion is not formed, so that the amount of deformation of the door frame is small.

In this situation, a force with which the door glass moves downward on the vehicle exterior side seal lip exceeds frictional resistance between the vehicle exterior side seal lip and the door glass, and the door glass slides downward on the vehicle exterior side seal lip. As a result, it is possible to prevent a space in which the vehicle exterior side seal lip can be reversed from being formed due to the deformation of the door frame, and it is possible to prevent the vehicle exterior side seal lip from being reversed, and thus, it is possible to prevent occurrence of abnormal noise due to the reversal.

According to claim 2 of the present invention, in the glass run according to claim 1 of the invention, the seal lip extension portion includes an extension increasing portion in which the length of the vehicle exterior side seal lip gradually increases from a connection portion between the general portion and the mold-forming portion, and a fixed extension portion that is continuous with the extension increasing portion and does not increase from the extension increasing portion.

According to claim 2 of the present invention, since the seal lip extension portion includes the extension increasing portion in which the length of the vehicle exterior side seal lip gradually increases from the connection portion between the general portion and the mold-forming portion, the length of the vehicle exterior side seal lip may not rapidly change at the connection portion between the general portion and the mold-forming portion, and it is possible to prevent occurrence of rapid variation in the movement of the vehicle exterior side seal lip with the connection portion between the general portion and the mold-forming portion being sandwiched when the door glass is opened.

Incidentally, the length of the mold-forming portion in the vehicle front-rear direction is considerably longer than the length of the vehicle exterior side seal lip. On the other hand, the length of the seal lip extension portion is shorter than the length of the vehicle exterior side seal lip. According to claim 2 of the present invention, the seal lip extension portion includes the extension increasing portion and the fixed extension portion that is continuous with the extension increasing portion and does not increase the seal lip length from the extension increasing portion. Therefore, the inclusion of the extension increasing portion that exerts an effect of preventing reversal within an appropriate length from the connection portion with the general portion and the fixed extension portion that takes over such effect by not changing the length of the seal lip extension portion can prevent the vehicle exterior side seal lip from being reversed over the entire mold-forming portion, which can prevent occurrence of abnormal noise due to the reversal.

According to claim 3 of the present invention, in the glass run according to claim 2 of the invention, the extension increasing portion is formed in a region of 10 mm to 20 mm in the mold-forming portion from the connection portion between the general portion and the mold-forming portion.

According to claim 3 of the present invention, in claim 2 or 3 of the invention, since the extension increasing portion is formed in the region of 10 mm to 20 mm in the mold-forming portion from the connection portion between the general portion and the mold-forming portion, the vehicle exterior side seal lip can be prevented from being reversed in the extension increasing portion, which can prevent the occurrence of abnormal noise due to the reversal.

When the region where the extension increasing portion is formed is less than 10 mm in the mold-forming portion from the connection portion between the general portion and the mold-forming portion, the movement of the vehicle exterior side seal lip with the connection portion between the general portion and the mold-forming portion being sandwiched when the door glass is opened greatly varies, which is not preferable. On the other hand, when the region where the extension increasing portion is formed exceeds 20 mm in the mold-forming portion from the connection portion between the general portion and the mold-forming portion, a region where the effect of the seal lip extension portion is insufficient exists long in the extension increasing portion from the connection portion between the general portion and the mold-forming portion. Therefore, particularly in the mold-forming portion near the connection portion between the general portion and the mold-forming portion, a space where the vehicle exterior side seal lip rotates downward, that is, where the vehicle exterior side seal lip can be reversed is formed, which is not preferable.

According to claim 4 of the present invention, in the glass run according to claims 1 to 3 of the present invention, a recessed portion capable of accommodating a distal end of the vehicle exterior side seal lip formed with the seal lip extension portion is formed on a vehicle exterior side of a lower surface of the bottom wall of the mold-forming portion.

In a state where the door glass is closed, a distance between the distal end portion of the vehicle exterior side seal lip and the lower surface of the bottom wall is very narrow. As a result of forming the seal lip extension portion in the mold-forming portion, the vehicle exterior side seal lip becomes longer, and thus the length thereof exceed a distance from a root portion of the vehicle exterior side seal lip in the general portion to the lower surface of the bottom wall. In this case, in the mold-forming portion, when the door glass is closed, the distal end portion of the vehicle exterior side seal lip hits the bottom wall and is then deformed, and the distal end portion of the vehicle exterior side seal lip formed with the seal lip extension portion is sandwiched between the bottom wall and the door glass, so that the door glass cannot be properly closed.

According to claim 4 of the present invention, since the recessed portion capable of accommodating the distal end of the vehicle exterior side seal lip formed with the seal lip extension portion is formed on the vehicle exterior side of the lower surface of the bottom wall of the mold-forming portion, even though the length of the vehicle exterior side seal lip exceeds the distance from the root portion of the vehicle exterior side seal lip in the general portion to the lower surface of the bottom wall, the distal end portion of the vehicle exterior side seal lip formed with the seal lip extension portion is not sandwiched between the bottom wall and the door glass, and the door glass can be closed in the mold-forming portion in the same manner as in the general portion.

Since the glass run attached to the inner periphery of the door frame of the door of the automobile, guiding raising and lowering of the door glass, and including the general portion formed by extrusion molding and the mold-forming portion that connects terminals of the general portion attached to the corner portion of the door frame, has a substantially U-shaped cross section including the vehicle exterior side wall, the vehicle interior side wall, and the bottom wall joining the vehicle exterior side wall and the vehicle interior side wall; and has the vehicle exterior side seal lip and the vehicle interior side seal lip that obliquely protrude in the inner direction of the opening having the substantially U-shaped cross section from the vehicle exterior side wall and the vehicle interior side wall, respectively, and the vehicle exterior side seal lip of the mold-forming portion is formed with the seal lip extension portion having the seal lip length extended as compared to the vehicle exterior side seal lip formed in the general portion, the contact angle between the vehicle exterior side seal lip and the door glass when the door glass is closed with the vehicle exterior side seal lip being elastically in contact with the door glass is smaller than that when the seal lip extension portion is not formed.

Therefore, the vehicle exterior side seal lip is still pulled by the door glass when the door glass is opened, but the force in the direction in which the vehicle exterior side seal lip pushes the door frame toward the vehicle exterior side at that time is smaller than that when the seal lip extension portion is not formed, so that the amount of deformation of the door frame is small.

In this situation, a force with which the door glass moves downward on the vehicle exterior side seal lip exceeds frictional resistance between the vehicle exterior side seal lip and the door glass, and the door glass slides downward on the vehicle exterior side seal lip. As a result, it is possible to prevent a space in which the vehicle exterior side seal lip can be reversed from being formed due to the deformation of the door frame, and it is possible to prevent the vehicle exterior side seal lip from being reversed, and thus, it is possible to prevent occurrence of abnormal noise due to the reversal.

BRIEF DESCRIPTION OF THE DRAWINGS

FIG. 7A is a cross-sectional view when the door glass is closed, and FIG. 7B is a cross-sectional view when the door glass is being opened;

FIGS. 9A to 9C are views for explaining a reversal phenomenon of a vehicle exterior side seal lip according to the prior art, where FIG. 9A is a view when a door glass is closed, FIG. 9B is a view when the door glass is being opened, and FIG. 9C is a view when the vehicle exterior side seal lip is reversed.

DETAILED DESCRIPTION OF PREFERRED EMBODIMENTS

An embodiment of the present invention will be described with reference to FIGS. 1 to 7. FIG. 1 is a left side view of a front side of an automobile 1. In an upper portion of a door 2, a door frame 3 is provided in a portion facing a peripheral edge of a vehicle body opening of a vehicle body, and a door glass 5 is attached so as to be freely raised and lowered.

A glass run 10 is formed in a shape in which a front vertical side portion 2b and a rear vertical side portion 2c of the door 2 in the vehicle front-rear direction and an upper side portion 2a along a roof shape of the door 2 are joined, is attached to an inner periphery of the door frame 3, guides the raising and lowering of the door glass 5, and seals between the door glass 5 and the door frame 3. In the glass run 10, in portions corresponding to the front vertical side portion 2b and the rear vertical side portion 2c of the door 2 in the vehicle front-rear direction and the upper side portion 2a along the roof shape of the door 2, after a general portion 11 manufactured by extrusion molding is cut into a predetermined size, the upper side portion 2a and the front vertical side portion 2b are joined by mold forming, and the upper side portion 2a and the rear vertical side portion 2c are joined by mold forming.

Note that in the glass run 10, the portion corresponding to the upper side portion 2a along the roof shape of the door 2 is bent so as to follow the roof shape of the door 2. The present embodiment describes a mold-forming portion 12 in a region X. The present invention also relates to a vehicle exterior side seal lip 21 to be described later corresponding to the upper side portion 2a in the mold-forming portion 12 in the region X.

Figure 3:
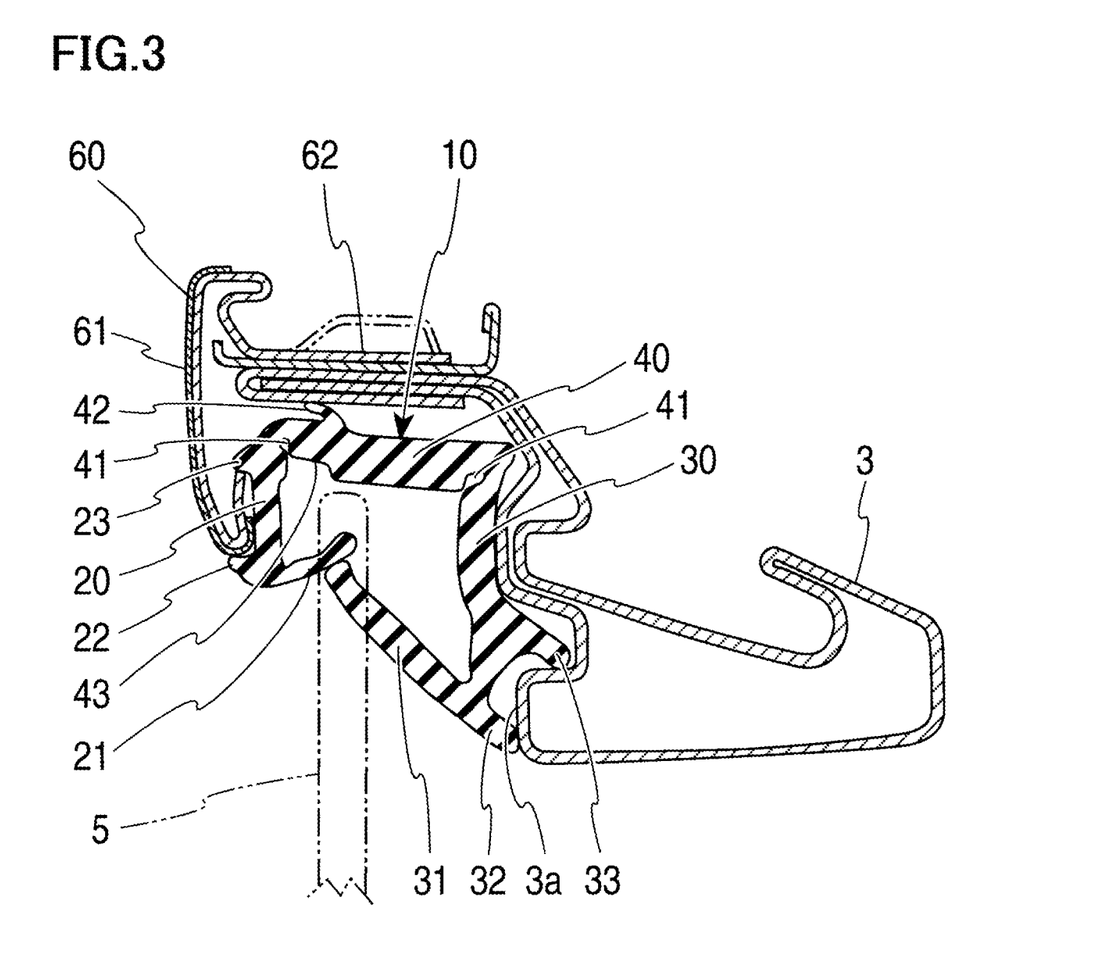
FIG. 3 is a cross-sectional view taken along line A-A in FIG. 2, and is a cross-sectional view of the mold-forming portion at a connection portion between a general portion and the mold-forming portion.

As illustrated in FIG. 3, the door frame 3 to which the glass run 10 is attached is of a so-called hidden type. The hidden-type door frame 3 has a narrow leading end on the vehicle exterior side, is covered with a door molding 60 attached to the outer periphery of the door frame 3, and is not visible from the vehicle exterior side.

The door molding 60 is continuously formed with a molding portion 61 and a retainer portion 62. The molding portion 61 and the retainer portion 62 may be formed separately. In the door molding 60, the retainer portion 62 is fixed to the door frame 3 with a rivet, a clip, a screw, or the like. The molding portion 61 and the retainer portion 62 are formed by bending a sheet metal such as stainless steel.

The molding portion 61 has a predetermined width so as to cover the distal end of the door frame 3, and its lower end is bent in a hairpin shape. The glass run 10 is sandwiched and held between the hairpin-like bent portion and the inner surface of the door frame 3.

Since the door molding 60 formed by bending a sheet metal such as stainless steel is used in the hidden-type door frame 3, the rigidity of the molding portion 61 of the door molding 60 particularly on the vehicle exterior side is slightly low, and the lower portion of the molding portion 61 tends to be easily deformed toward the vehicle exterior side when the door glass 5 is opened.

As illustrated in FIG. 3, the glass run 10 has the vehicle exterior side seal lip 21 and a vehicle interior side seal lip 31 which are curved obliquely and arcuately to protrude from a vehicle exterior side wall 20 and a vehicle interior side wall 30 toward an inside of an opening edge of a substantially U-shaped space in cross section (substantially U-shaped in alphabet) including the vehicle exterior side wall 20, the vehicle interior side wall 30, a bottom wall 40 joining the vehicle exterior side wall 20 and the vehicle interior side wall 30.

FIG. 3 is a view in which the glass run 10 is fitted to the door frame 3 and the door molding 60, and illustrates a state where the glass run 10 is not in contact with the door glass 5.

A groove 41 is formed at a joining portion between the vehicle interior side wall 30 and the vehicle exterior side wall 20 of the bottom wall 40 so that the glass run 10 can be easily bent when fitted to the door frame 6 and the door molding 60. On the other hand, a bottom wall abutting lip 42 is formed on the bottom wall 40 on the side opposite to the door glass 5, and when the glass run 10 is attached to the door frame 3 and the door molding 60, the bottom wall abutting lip 42 elastically contacts the door frame 3 to seal between the bottom wall 40 and the door frame 3.

A recessed portion 43 is formed continuously with the groove 41 on the lower surface of the bottom wall 40 on the vehicle exterior side. This is because a distal end portion of the vehicle exterior side seal lip 21 formed with a seal lip extension portion 24 to be described later can be accommodated.

A vehicle interior side molding lip 32 is formed in the vehicle interior direction from a substantially distal end (top) of the vehicle interior side wall 30. On the vehicle interior side of the vehicle interior side wall 30, a vehicle interior side holding lip 33 is formed toward the distal end side, and the vehicle interior side molding lip 32 and the vehicle interior side holding lip 33 sandwich a protruded portion 3a protruding from the lower side of the door frame 3 to the vehicle exterior side.

On the other hand, a vehicle exterior side holding lip 23 is formed on the vehicle exterior side in the vicinity of the joining portion of the vehicle exterior side wall 20 with the bottom wall 40 toward the distal end side of the vehicle exterior side wall 20. Further, a vehicle exterior side molding lip 22 is formed in the vehicle exterior direction from a substantially distal end (top) of the vehicle exterior side wall 20, and the vehicle exterior side holding lip 23 and the vehicle exterior side molding lip 22 sandwich between a vehicle interior side upper portion and a lower end of the door molding 60 whose lower portion is bent in a hairpin shape.

Figure 2:
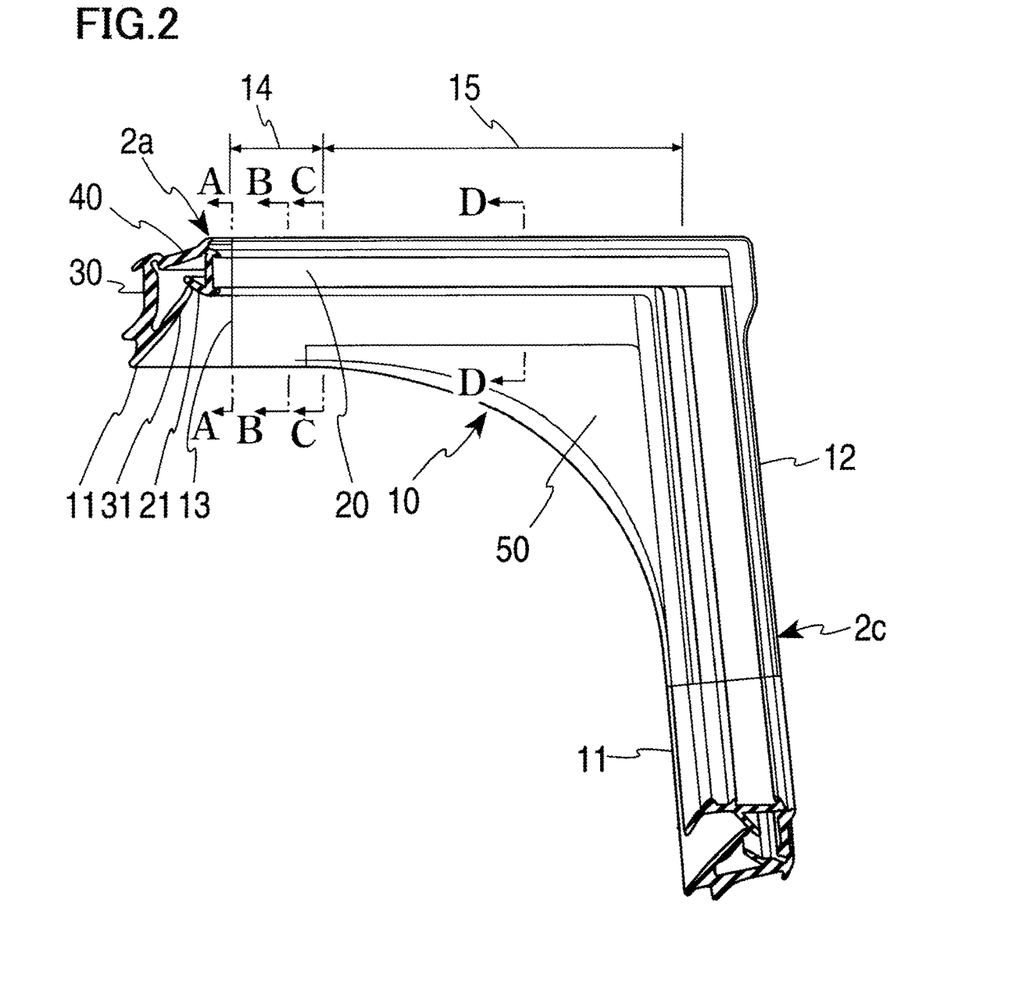
FIG. 2 is a front perspective view of a mold-forming portion of a glass run according to an embodiment of the present invention.

As illustrated in FIG. 2, in a corner portion of the mold-forming portion 12 of the glass run 10, a corner cover 50 is extended from a distal end of the vehicle interior side wall 30 in an extending direction of the vehicle interior side wall 30. This is because the radius of curvature of the corner portion at the peripheral edge of the opening of the vehicle body is larger than the radius of curvature of the corner portion of the door frame 3, and thus the radius of curvature of the corner portion at the peripheral edge of the opening of the vehicle body is adjusted in the same manner as the radius of curvature of the peripheral edge of the opening of the vehicle body on the door frame 3 side, and the adjusted corner portion on the door frame 3 side is covered to improve sealability and appearance.

Note that FIG. 3 is a cross-sectional view taken along line A-A in FIG. 2, and is a cross-sectional view of the mold-forming portion 12 at a connection portion 13 between the general portion 11 and the mold-forming portion 12 by extrusion molding. Therefore, the vehicle exterior side seal lip 21 in FIG. 3 has the same length as the vehicle exterior side seal lip 21 in FIG. 2 of the general portion 11.

Figure 4:
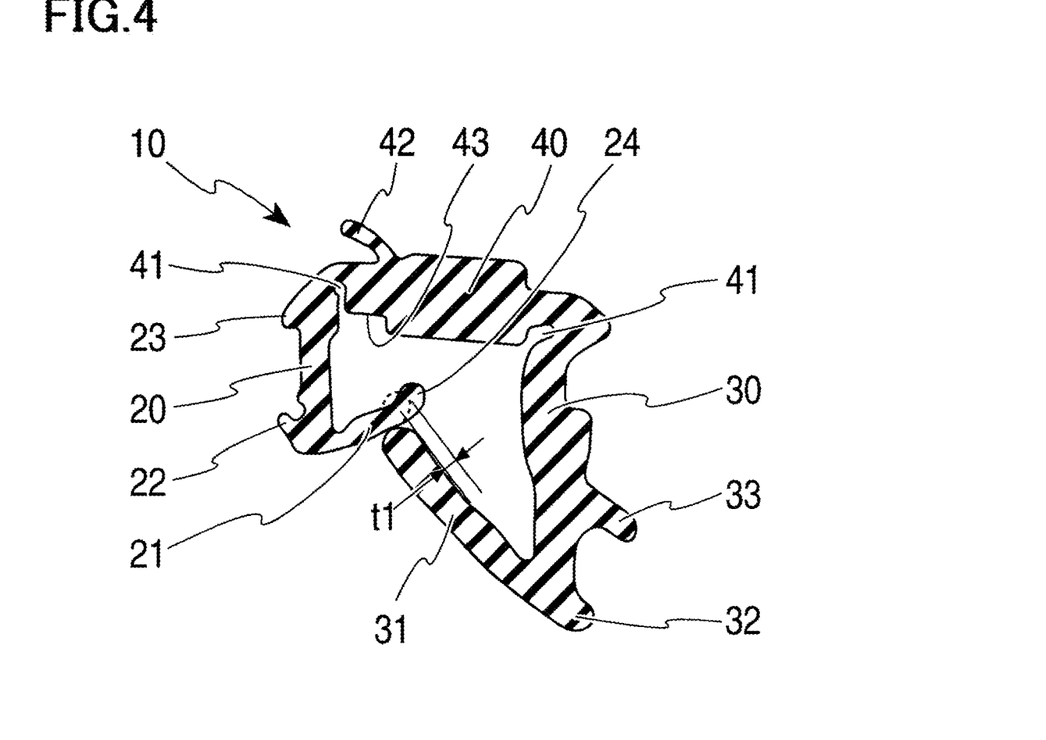
FIG. 4 is a cross-sectional view taken along line B-B in FIG. 2, and is a cross-sectional view of an extension increasing portion in the mold-forming portion.
Figure 5:
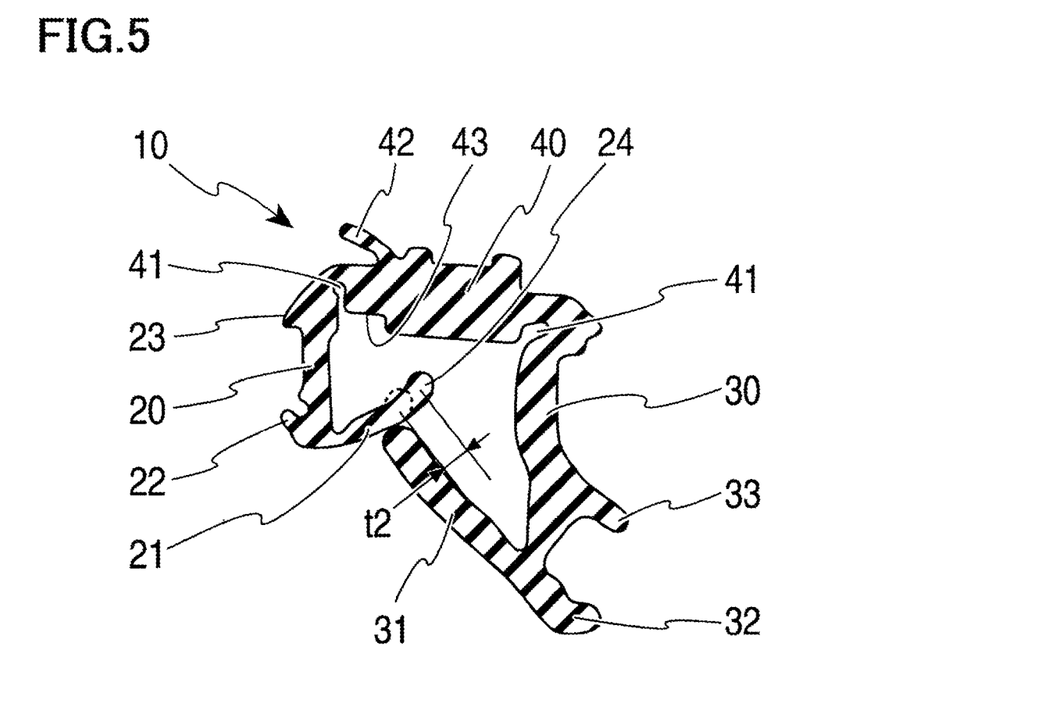
FIG. 5 is a cross-sectional view taken along line C-C in FIG. 2, and is a cross-sectional view at an end position of the extension increasing portion (a start position of a fixed extension portion) in the mold-forming portion.
Figure 6:
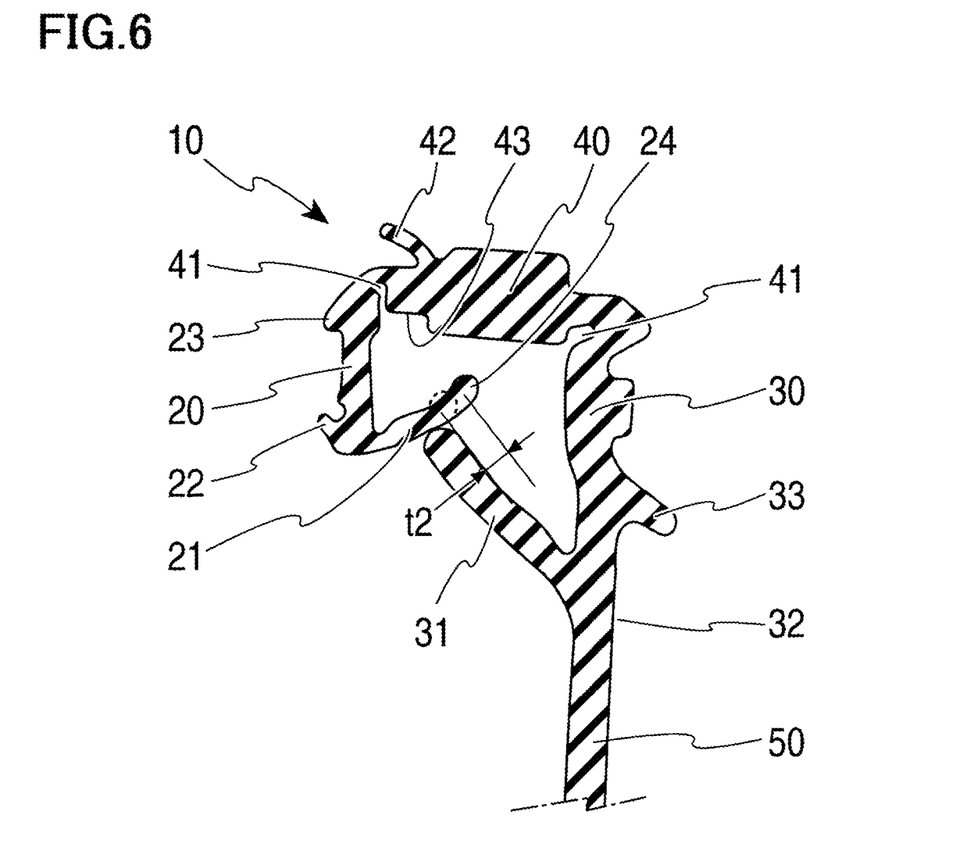
FIG. 6 is a cross-sectional view taken along line D-D in FIG. 2, and is a cross-sectional view of the fixed extension portion in the mold-forming portion.

Next, the seal lip extension portion 24 will be described with reference to FIGS. 2 and 4 to 6. FIGS. 4 to 6 are views of the glass run 10 alone when the glass run 10 is fitted to the door frame 3 and the door molding 60 in the same manner as in FIG. 3, and are in a state of not being in contact with the door glass 5.

As shown in FIG. 2, the seal lip extension portion 24 is formed in the mold-forming portion 12 from the connection portion 13 between the general portion 11 and the mold-forming portion 12 by extrusion molding and includes an extension increasing portion 14 and a fixed extension portion 15.

The extension increasing portion 14 is a region where the length of the vehicle exterior side seal lip 21 gradually increases from the connection portion 13 between the general portion 11 and the mold-forming portion 12 to a predetermined value, and the fixed extension portion 15 is continuous with the extension increasing portion 14 and is a region where the seal lip length of the vehicle exterior side seal lip 21 does not increase from the extension increasing portion 14 and is maintained at a constant value.

In the present embodiment, the region of the extension increasing portion 14 is formed in a region 15 mm from the connection portion 13 between the general portion 11 and the mold-forming portion 12 in the mold-forming portion 12. Note that, as described above, the region where the extension increasing portion 14 is formed is desirably formed in a region of 10 mm to 20 mm in the mold-forming portion 12 from the connection portion 13 between the general portion 11 and the mold-forming portion 12.

FIG. 4 is a cross-sectional view of the extension increasing portion 14 in the mold-forming portion 12 taken along line B-B in FIG. 2, and the seal lip extension portion 24 extended from the vehicle exterior side seal lip length of the general portion 11 has a length t1 of 0.8 mm. FIG. 5 is a cross-sectional view taken along line C-C in FIG. 2 at an end position of the extension increasing portion 14 and a start position of the fixed extension portion 15 in the mold-forming portion 12. Therefore, the distance from line A-A to line C-C is 15 mm, which is the extension increasing portion 14. The seal lip extension portion 24 extended from the vehicle exterior side seal lip 21 of the general portion 11 at the end position of the extension increasing portion 14 has a length t2 of 1.5 mm.

The length of the seal lip extension portion 24 is desirably 1 mm to 2 mm. When the length is less than 1 mm, the effect of the present invention cannot be exhibited, and when the door glass 5 is opened, the vehicle exterior side seal lip 21 is reversed, and thus abnormal noise more likely to occur. On the other hand, when the length is more than 2 mm, resistance at the time of opening and closing the door glass 5 increases in the mold-forming portion 12, which adversely affects smooth opening and closing of the door glass 5.

Furthermore, when the door glass 5 is closed, even though the recessed portion 43 is formed, the distal end portion of the vehicle exterior side seal lip 21 formed with the seal lip extension portion 24 is sandwiched between the bottom wall 40 and the door glass 5, so that the door glass 5 cannot be properly closed. In addition, when the recessed portion 43 is deeply formed in order to avoid the vehicle exterior side seal lip 21 from being sandwiched between the bottom wall 40 and the door glass 5, the strength of the bottom wall 40 decreases.

FIG. 6 is a cross-sectional view taken along line D-D in FIG. 2, and is a cross-sectional view of the fixed extension portion 15 in the mold-forming portion 12. Since the fixed extension portion 15 is continuous with the extension increasing portion 14 and is a region where the length of the vehicle exterior side seal lip 21 does not increase from the extension increasing portion 14, the length of the seal lip extension portion 24 is 1.5 mm, which is the same as t2 in FIG. 5.

In FIGS. 4 to 6, a broken line portion indicates the vehicle exterior side seal lip 21 in the general portion 11 where the seal lip extension portion 24 is not formed.

Figure 7:
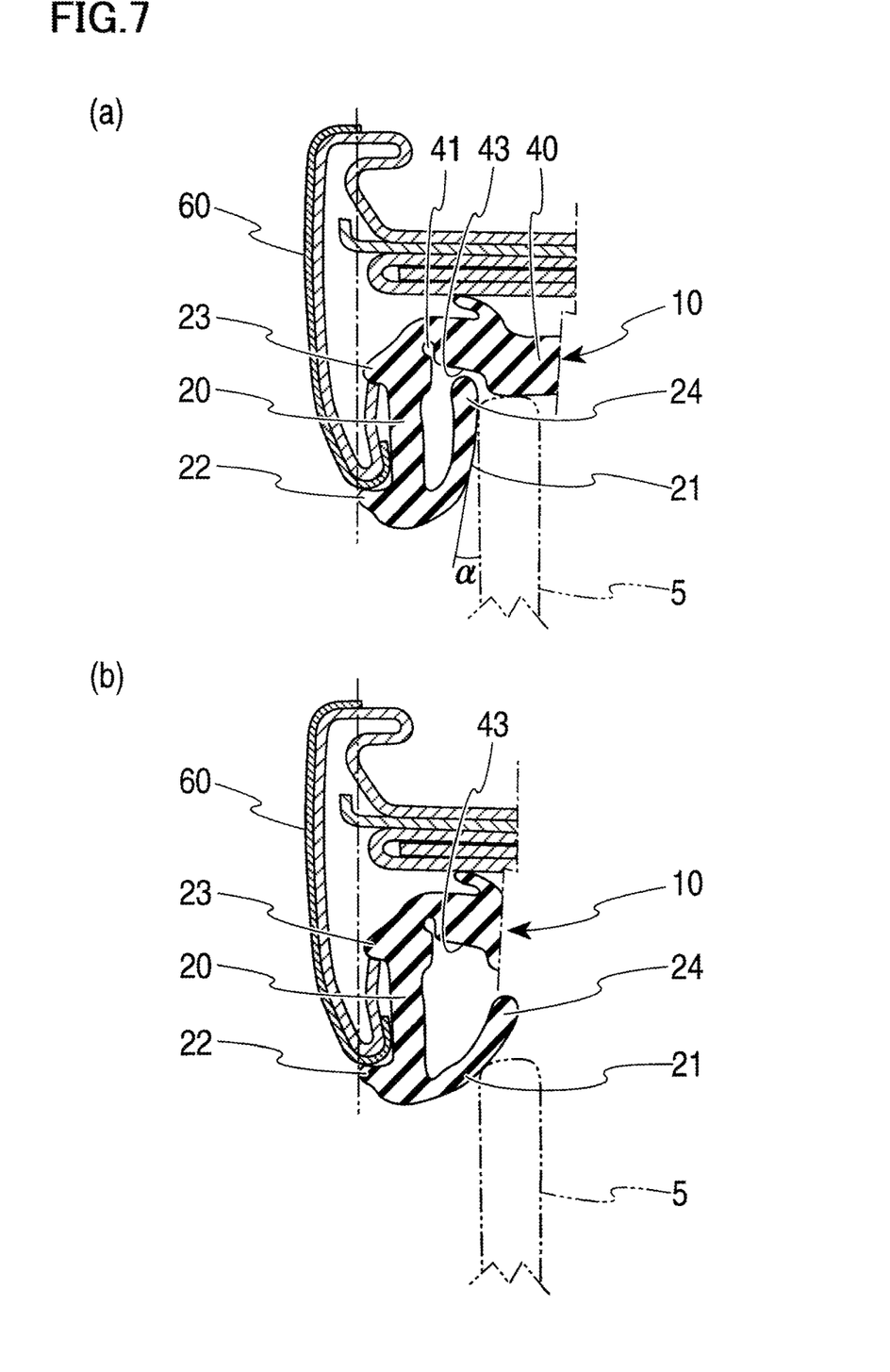
FIGS. 7A and 7B are cross-sectional views taken along line C-C in FIG. 2 for explaining a relationship between a door molding, a door glass, and the glass run when the door glass is opened according to the embodiment of the present invention, where

The behaviors of the door glass 5, the vehicle exterior side wall 20 and the vehicle exterior side seal lip 21 of the glass run 10, and the door molding 60 when the door glass 5 is lowered from the fully closed state, associated with the formation of the seal lip extension portion 24, will be described with reference to FIG. 7.

FIG. 7A illustrates a state where the door glass 5 is closed, which is the same as FIG. 9A illustrated above. A contact angle α between the vehicle exterior side seal lip 21 and the door glass 5 when the door glass is closed with the vehicle exterior side seal lip 21 formed with the seal lip extension portion 24 being elastically in contact with the door glass 5 is smaller than a contact angle β when the seal lip extension portion 24 is not formed (FIG. 9A).

When the door glass 5 starts to open, the vehicle exterior side seal lip 21 is still pulled by the door glass 5, and a force of lowering the door glass 5 is transmitted to the distal end portion of the vehicle exterior side seal lip 21 and pushes the door molding 60 toward the vehicle exterior side, but the force in that direction is smaller than that when the seal lip extension portion 24 is not formed, so that the amount of deformation of the door molding 60 is small.

In this state, a force with which the door glass 5 moves downward on the vehicle exterior side seal lip 21 exceeds frictional resistance between the vehicle exterior side seal lip 21 and the door glass 5, and the door glass 5 slides downward on the vehicle exterior side seal lip 21, so that the door molding 60 does not deform much. Then, as illustrated in FIG. 7B, the upper end portion of the door glass 5 passes by the vehicle exterior side seal lip 21. Therefore, it is possible to prevent a space in which the vehicle exterior side seal lip can be reversed from being formed due to the deformation of the door frame as illustrated in FIG. 9B, and it is possible to prevent the vehicle exterior side seal lip from being reversed, and thus, it is possible to prevent occurrence of abnormal noise due to the reversal.

The glass run 10 can be formed by extrusion molding and mold forming using a synthetic rubber or a thermoplastic elastomer. For example, EPDM rubber can be used as the synthetic rubber, and polyolefin-based elastomer can be used as the thermoplastic elastomer.

The practice of the present invention is not limited to the above embodiment, and various modifications can be made without departing from the object of the present invention.

For example, in the present embodiment, the hidden-type door frame has been described, but the present invention is not limited to the hidden-type door frame and can be applied to other types of door frames such as a channel type.

For example, in the present embodiment, the recessed portion 43 for accommodating the distal end of the seal lip extension portion 24 is formed in the bottom wall 40. However, when the door glass 5 is closed, in the case in which the distal end portion of the vehicle exterior side seal lip 21 in which the seal lip extension portion 24 is formed does not abut the bottom wall 40 without forming the recessed portion 43, the recessed portion 43 may not be formed.

What is claimed is:

1. A glass run attached to an inner periphery of a door frame of a door of an automobile, and guiding raising and lowering of a door glass, the glass run comprising:
a general portion formed by extrusion molding; and
a mold-forming portion that connects terminals of the general portion attached to a corner portion of the door frame,
wherein the glass run has a substantially U-shaped cross section comprising a vehicle exterior side wall, a vehicle interior side wall, and a bottom wall joining the vehicle exterior side wall and the vehicle interior side wall; and has a vehicle exterior side seal lip and a vehicle interior side seal lip that obliquely protrude in an inner direction of an opening having the substantially U-shaped cross section from the vehicle exterior side wall and the vehicle interior side wall, respectively, and
the vehicle exterior side seal lip of the mold-forming portion is formed with a seal lip extension portion having a seal lip length extended as compared to the vehicle exterior side seal lip formed in the general portion.

2. The glass run according to claim 1, wherein the seal lip extension portion comprises an extension increasing portion in which a length of the vehicle exterior side seal lip gradually increases from a connection portion between the general portion and the mold-forming portion, and a fixed extension portion that is continuous with the extension increasing portion and does not increase from the extension increasing portion.

3. The glass run according to claim 2, wherein the extension increasing portion is formed in a region of 10 mm to 20 mm in the mold-forming portion from the connection portion between the general portion and the mold-forming portion.

4. The glass run according to claim 1, wherein a recessed portion capable of accommodating a distal end portion of the vehicle exterior side seal lip formed with the seal lip extension portion is formed on a vehicle exterior side of a lower surface of the bottom wall of the mold-forming portion.

\* \* \* \* \*